United States Patent Office 3,375,207
Patented Mar. 26, 1968

3,375,207
CATALYTIC POLYMERIZATION OF
ALKYLENE OXIDES
Herbert C. Kaufman, New Haven, Conn., assignor to Olin Mathieson Chemical Corporation, a corporation of Virginia
No Drawing. Continuation-in-part of application Ser. No. 232,258, Oct. 22, 1962. This application Oct. 20, 1964, Ser. No. 405,277
8 Claims. (Cl. 260—2)

ABSTRACT OF THE DISCLOSURE

In the process for polymerizing an alkylene oxide selected from the group consisting of ethylene oxide, propylene oxide, butylene oxide, 4,4,4-trichlorobutylene oxide-1,2, styrene oxide, and mixtures thereof by heating the oxide in the presence of a catalyst, the improvement which comprises employing as said catalyst a catalytic proportion of a mixture of aluminum hydride and certain metal acetylacetonates.

This application is a continuation-in-part of my copending application filed Oct. 22, 1962, Ser. No. 232,258, issued Mar. 8, 1966, as U.S. Patent No. 3,239,567.

This invention relates to an improved process for the polymerization of alkylene oxides and compositions produced thereby. More particularly, this invention relates to the use of novel catalysts in processes for the polymerization of alkylene oxides, and compositions produced thereby.

Polymerization of olefin oxides in the presence of a catalyst has been carried out commercially for several years. Recently polymers have been prepared by the use of a "ferric chloride complex of propylene oxide" which provides catalytic action. This complex must be prepared in a separate reaction with extreme care and stored under vacuum prior to use. This catalyst and other previously available catalysts have certain inherent disadvantages with respect to either preparation at a desired reproducible activity, or in being difficult to remove from the polymer, or in other properties.

It is a primary object of this invention to provide an improved process for polymerization of alkylene oxides.

Another object of this invention is to provide a novel catalyst capable of promoting the desired polymerization of alkylene oxides.

Still another object of this invention is to provide novel olefin polymers.

These and other objects of this invention will be apparent from the following detail description thereof.

It has now been discovered that the polymerization or co-polymerization of alkylene oxides is effectively promoted by incorporating in the reaction mixture a catalytic proportion of a mixture of aluminum hydride and a metal acetylacetone. In addition, novel olefin polymers have also been discovered.

Aluminum hydride used as a component of the mixture of catalysts in the instant invention is preferably of the nonsolvated type. One technique for preparing this type of aluminum hydride is by reacting an ether solution of aluminum chloride with lithium aluminum hydride, which yields a solution of aluminum hydride. This solution is contacted with an inert liquid such as pentane, which causes precipitation of solid aluminum hydride. One procedure for preparing aluminum hydride is set forth in technical report to the Office of Naval Research, Contract OMR–494 (04), by M. John Rice, Jr., with the assistance of George Chizinsky, Department of Chemistry, Tufts University, Medford 55, Mass., Aug. 1, 1956. The "Journal of the American Chemical Society," volume 77 (1955), pages 3164–3165, also discloses a technique for preparing aluminum hydride.

Metal acetylacetonates which are preferably used as a component of the catalytic mixture of this invention include acetylacetonates of zirconium, zinc, beryllium, iron and mixtures thereof. Other suitable metal acetylacetonates includes acetylacetonates of cobalt, nickel, chromium, vanadium, titanium, mixtures thereof, and the like. The catalyst mixture of this invention contains aluminum hydride and metal acetylacetonate in a weight ratio of between about 3:1 and about 1:9, and preferably between about 1:1 and about 1:4.

The proportion of catalyst mixture added to the alkylene oxide to effect polymerization is generally between about 0.1 and about 2.5 percent by weight of the alkylene oxide, and preferably between about 0.3 and about 1.4 percent by weight of the alkylene oxide. However any catalytic proportion of catalyst mixture having a catalytic effect upon the polymerization may be employed. When a mixture is added in a proportion above about 2.5 percent by weight of the alkylene oxide, generally there is little or no improvement in the degree of polymerization, and the proportion above about 2.5 percent merely acts as a diluent.

Alkylene oxides, or epoxides, which may readily be polymerized by the catalyst mixture of this invention include lower alkylene oxides containing between about 2 and about 6 carbon atoms such as ethylene oxide, propylene oxide, butylene oxide, halogenated alkylene oxides such as 4,4,4-trichlorobutylene oxide-1,2, and aryl substituted alkylene oxides such as styrene oxide, and mixtures thereof. Generally the commercial forms of the alkylene oxides are employed. For example the commercial form of propylene oxide is 1,2-propylene oxide, and not the 1,3-form. The above mentioned alkylene oxides may be polymerized, or mixtures thereof copolymerized, to stereospecific long-chain compounds characterized by high molecular weight, from between about 1,000 to about 100,000, as indicated by light scattering measurements.

Polymerization of the alkylene oxides is effected in the absence of a solvent or diluent, but better control of temperature and the rate of reaction, and greater uniformity of product result when an inert solvent or diluent, such as benzene, carbon tetrachloride, ethyl acetate or aliphatic hydrocarbon is used. The polymerization reaction is carried out generally within the temperature range between about 50° C. and about 250° C. for a period of between about one and 24 hours. However it is preferred to employ a reaction temperature between about 110° C. and about 180° C. for at least about 12 hours.

Alkylene oxide polymers produced in accordance with the technique of this invention are oils, greases, gels and/or rubbers, the utility of which is well known in the art.

The following examples are presented to define the invention more fully without any intention of being limited thereby. All parts and percentages are by weight unless otherwise specified.

*Example I*

To a stainless steel rocking autoclave flushed with nitrogen, 1 part of aluminum hydride, 600 parts of propylene oxide (commercial grade), and 3 parts of zirconium acetylacetonate were added in that order. The temperature was increased to about 135° C. over a period of about 4 hours and held at that temperature for another 12 hours. The maximum pressure obtained during this period was about 250 p.s.i.g. At the end of this period, the autoclave was cooled, and the contents were washed with carbon tetrachloride, and with a 10 percent aqueous solution of hydrochloric acid, and twice more with water to effectively destroy the aluminum hydride and dissolve the zirconium salt in the aqueous portion. Upon drying the carbon tetrachloride fraction and separating carbon tetrachloride therefrom, 420 parts of a firm nearly-white colored grease resulted. The grease had an average molecular weight of about 1,100 as determined by an osmometer.

*Example II*

The grease obtained from Example I was tested for lubricity in a Falex Lubricity Tester. The results indicated seizure at 550 pounds. This value was better by a factor of 2 over ordinary petroleum or glycol-based greases. This grease was lubricious at temperatures as low as −50° F., with no crystallization or coalescence, and was thermally stable up to a temperature of about 400° F., without the use of any additives. Lubricity of the grease is further improved by 25 percent upon catalytic hydrogenation. These tests demonstrated the excellent lubricity of the grease.

*Example III*

A procedure similar to Example I was repeated, adding to the autoclave 78 parts of 4,4,4-trichlorobutylene oxide-1,2, 0.1 part of aluminum hydride and 0.3 part of zinc acetylacetonate. The temperature of the reaction was maintained at about 110° C. for about 24 hours. The maximum pressure obtained during this period was about 13 p.s.i.g. About 55 parts of a resinous product was obtained.

*Example IV*

A procedure similar to Example I was employed, adding 60 parts of propylene oxide, 0.1 part of aluminum hydride and 0.3 part of ferric acetylacetonate. The maximum temperature was about 115° C. and the maximum pressure was about 95 p.s.i.g. during reaction period of about 24 hours. A colorless rubber was produced from this polymerization reaction.

*Example V*

The procedure of Example IV was repeated, employing beryllium acetylacetonate instead of ferric acetylacetonate. The product was a colorless grease.

For purposes of comparison, when only aluminum hydride was used as the catalyst there was substantially no polymerization of the alkylene oxide.

Various modifications of the invention, some of which have been referred to above may be employed without departing from the scope of this invention. What is desired to be secured by Letters Patent is:

What is claimed is:
1. In the process for polymerizing an alkylene oxide by heating said alkylene oxide in the presence of a catalyst wherein said alkylene oxide is selected from the group consisting of ethylene oxide, propylene oxide, butylene oxide, 4,4,4-trichlorobutylene oxide-1,2, styrene oxide, and mixtures thereof, the improvement which comprises employing as said catalyst a catalytic proportion of a mixture of aluminum hydride and a metal acetylacetonate, said metal acetylacetonate being selected from the group consisting of zirconium acetylacetonate, zinc acetylacetonate, beryllium acetylacetonate, iron acetylacetonate, cobalt acetylacetonate, nickel acetylacetonate, chromium acetylacetonate, vanadium acetylacetonate, titanium acetylacetonate and mixtures thereof, the weight ratio of aluminum hydride to metal acetylacetonate being between about 3:1 and 1:9.
2. The process of claim 1 wherein the catalytic proportion of said catalyst mixture is between about 0.1 and 2.5 percent by weight of said alkylene oxide.
3. The process of claim 2 wherein said heating is effected at a temperature in the range of between about 50 and about 250° C. for a period of between about one and about twenty-four hours.
4. The process of claim 3 wherein said alkylene oxide is propylene oxide.
5. The process of claim 4 wherein said metal acetonate is iron acetylacetonate.
6. The process of claim 4 wherein said metal acetonate is zinc acetylacetonate.
7. The process of claim 4 wherein said metal acetonate is beryllium acetylacetonate.
8. The process of claim 4 wherein said metal acetylacetonate is zirconium acetylacetonate.

References Cited

UNITED STATES PATENTS

| | | | |
|---|---|---|---|
| 2,870,101 | 1/1959 | Stewart | 260—2 |
| 2,866,761 | 12/1958 | Hill et al. | 260—2 |
| 2,895,931 | 7/1959 | Klug | 260—20 X |
| 3,135,705 | 6/1964 | Vandenberg | 260—2 |
| 3,152,131 | 10/1964 | Heberling | 252—431 |

OTHER REFERENCES

J. of Polymer Science, vol. 27, Issue No. 115, 1958 (pp. 584—586 relied on) 260—2 EPA/Lit.

WILLIAM H. SHORT, *Primary Examiner.*

T. PERTILLA, *Assistant Examiner.*